US011579690B2

(12) United States Patent
Monti et al.

(10) Patent No.: US 11,579,690 B2
(45) Date of Patent: Feb. 14, 2023

(54) GAZE TRACKING APPARATUS AND SYSTEMS

(71) Applicant: Sony Interactive Entertainment Inc., Tokyo (JP)

(72) Inventors: Maria Chiara Monti, London (GB); Fabio Cappello, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/315,429

(22) Filed: May 10, 2021

(65) Prior Publication Data

US 2021/0357026 A1 Nov. 18, 2021

(30) Foreign Application Priority Data

May 13, 2020 (GB) ...................................... 2007048

(51) Int. Cl.
*G06F 3/01* (2006.01)
(52) U.S. Cl.
CPC .................... *G06F 3/013* (2013.01)
(58) Field of Classification Search
CPC ............ G06F 3/013; G02B 2027/0138; G02B 2027/014; G02B 2027/0187; G02B 27/0093; G02B 27/0172
See application file for complete search history.

(56) References Cited

U.S. PATENT DOCUMENTS

| | | | | |
|---|---|---|---|---|
| 10,261,592 | B2 * | 4/2019 | Keller | G06F 3/017 |
| 10,936,056 | B2 * | 3/2021 | Aleem | G02B 27/0093 |
| 2002/0190953 | A1 * | 12/2002 | Gordon | G06F 3/033 |
| | | | | 345/166 |
| 2012/0250152 | A1 * | 10/2012 | Larson | G02B 30/25 |
| | | | | 359/464 |
| 2014/0247286 | A1 * | 9/2014 | Chi | G09G 3/003 |
| | | | | 345/672 |
| 2015/0097772 | A1 * | 4/2015 | Starner | G02B 27/017 |
| | | | | 345/158 |
| 2017/0123215 | A1 * | 5/2017 | Li | G06F 3/038 |
| 2017/0290504 | A1 | 10/2017 | Khaderi | |
| 2019/0107720 | A1 | 4/2019 | Palacios | |
| 2019/0317598 | A1 * | 10/2019 | Aleem | H04N 13/383 |

OTHER PUBLICATIONS

Combined Search and Examination Report for corresponding GB Application No. GB2007048 8, 9 pages, dated Feb. 18, 2021.
Extended European Search Report for corresponding EP Application No. 21167601.0, 9 pages, dated Oct. 1, 2021.

* cited by examiner

*Primary Examiner* — Mihir K Rayan
(74) *Attorney, Agent, or Firm* — Matthew B. Dernier, Esq.

(57) ABSTRACT

A system configured to perform an eye tracking process using a head-mountable eye-tracking arrangement, the system comprising an eye tracking unit, located on the head-mountable arrangement, operable to detect motion of one or both of the user's eyes, a relative motion identification unit operable to identify motion of the head-mountable arrangement relative to the user's head, and a correction unit operable to determine a correction to the eye tracking process in dependence upon the identified motion of the user's head relative to the head-mountable arrangement.

13 Claims, 9 Drawing Sheets

LEFT　　　　　　　RIGHT

GAZE TRACKING APPARATUS AND SYSTEMS

BACKGROUND OF THE INVENTION

Field of the Invention

This disclosure relates to a gaze tracking system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Gaze tracking systems are used to identify a location of a subject's gaze within an environment; in many cases, this location may be a position on a display screen that is being viewed by the subject. In a number of existing arrangements, this is performed using one or more inwards-facing cameras directed towards the subject's eye (or eyes) in order to determine a direction in which the eyes are oriented at any given time. Having identified the orientation of the eye, a gaze direction can be determined and a focal region may be determined as the intersection of the gaze direction of each eye.

One application for which gaze tracking is considered of particular use is that of use in head-mountable display units (HM Ds). The use in HM Ds may be of particular benefit owing to the close proximity of inward-facing cameras to the user's eyes, allowing the tracking to be performed much more accurately and precisely than in arrangements in which it is not possibly to provide the cameras with such proximity.

By utilising gaze detection techniques, it may be possible to provide a more efficient and/or effective processing method for generating content or interacting with devices.

For example, gaze tracking may be used to provide user inputs or to assist with such inputs—a continued gaze at a location may act as a selection, or a gaze towards a particular object accompanied by another input (such as a button press) may be considered as a suitable input. This may be more effective as an input method in some embodiments, particularly in those in which a controller is not provided or when a user has limited mobility.

Foveal rendering is an example of a use for the results of a gaze tracking process in order to improve the efficiency of a content generation process. Foveal rendering is rendering that is performed so as to exploit the fact that human vision is only able to identify high detail in a narrow region (the fovea), with the ability to discern detail tailing off sharply outside of this region.

In such methods, a portion of the display is identified as being an area of focus in accordance with the user's gaze direction. This portion of the display is supplied with high-quality image content, while the remaining areas of the display are provided with lower-quality (and therefore less resource intensive to generate) image content. This can lead to a more efficient use of available processing resources without a noticeable degradation of image quality for the user.

It is therefore considered advantageous to be able to improve gaze tracking methods, and/or apply the results of such methods in an improved manner. It is in the context of such advantages that the present disclosure arises.

Various aspects and features of the present invention are defined in the appended claims and within the text of the accompanying description.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
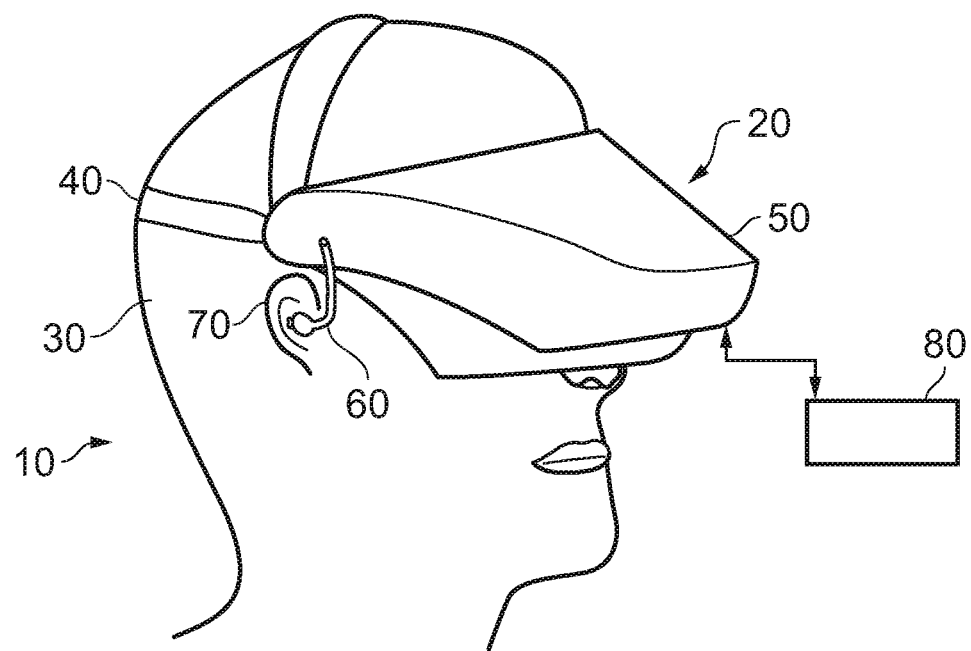
FIG. 1 schematically illustrates an HMD worn by a user.

Referring now to FIG. 1, a user 10 is wearing an HMD 20 (as an example of a generic head-mountable apparatus—other examples including audio headphones or a head-mountable light source) on the user's head 30. The HMD comprises a frame 40, in this example formed of a rear strap and a top strap, and a display portion 50. As noted above, many gaze tracking arrangements may be considered particularly suitable for use in HMD systems; however, use with such an HMD system should not be considered essential.

Note that the HMD of FIG. 1 may comprise further features, to be described below in connection with other drawings, but which are not shown in FIG. 1 for clarity of this initial explanation.

The HMD of FIG. 1 completely (or at least substantially completely) obscures the user's view of the surrounding environment. All that the user can see is the pair of images displayed within the HMD, as supplied by an external processing device such as a games console in many embodiments. Of course, in some embodiments images may instead (or additionally) be generated by a processor or obtained from memory located at the HMD itself.

The HMD has associated headphone audio transducers or earpieces 60 which fit into the user's left and right ears 70. The earpieces 60 replay an audio signal provided from an external source, which may be the same as the video signal source which provides the video signal for display to the user's eyes.

The combination of the fact that the user can see only what is displayed by the HMD and, subject to the limitations of the noise blocking or active cancellation properties of the earpieces and associated electronics, can hear only what is provided via the earpieces, mean that this HMD may be considered as a so-called "full immersion" HMD. Note however that in some embodiments the HMD is not a full immersion HMD, and may provide at least some facility for the user to see and/or hear the user's surroundings. This could be by providing some degree of transparency or partial transparency in the display arrangements, and/or by projecting a view of the outside (captured using a camera, for example a camera mounted on the HMD) via the HMD's displays, and/or by allowing the transmission of ambient sound past the earpieces and/or by providing a microphone to generate an input sound signal (for transmission to the earpieces) dependent upon the ambient sound.

A front-facing camera 122 may capture images to the front of the HMD, in use. Such images may be used for head tracking purposes, in some embodiments, while it may also be suitable for capturing images for an augmented reality (AR) style experience. A Bluetooth® antenna 124 may provide communication facilities or may simply be arranged as a directional antenna to allow a detection of the direction of a nearby Bluetooth transmitter.

In operation, a video signal is provided for display by the HMD. This could be provided by an external video signal source 80 such as a video games machine or data processing apparatus (such as a personal computer), in which case the signals could be transmitted to the HMD by a wired or a wireless connection. Examples of suitable wireless connections include Bluetooth® connections. Audio signals for the earpieces 60 can be carried by the same connection. Similarly, any control signals passed from the HMD to the video (audio) signal source may be carried by the same connection. Furthermore, a power supply (including one or more batteries and/or being connectable to a mains power outlet) may be linked by a cable to the HMD. Note that the power supply and the video signal source 80 may be separate units or may be embodied as the same physical unit. There may be separate cables for power and video (and indeed for audio) signal supply, or these may be combined for carriage on a single cable (for example, using separate conductors, as in a USB cable, or in a similar way to a "power over Ethernet" arrangement in which data is carried as a balanced signal and power as direct current, over the same collection of physical wires). The video and/or audio signal may be carried by, for example, an optical fibre cable. In other embodiments, at least part of the functionality associated with generating image and/or audio signals for presentation to the user may be carried out by circuitry and/or processing forming part of the HMD itself. A power supply may be provided as part of the HMD itself.

Some embodiments of the invention are applicable to an HMD having at least one electrical and/or optical cable linking the HMD to another device, such as a power supply and/or a video (and/or audio) signal source. So, embodiments of the invention can include, for example:

(a) an HMD having its own power supply (as part of the HMD arrangement) but a cabled connection to a video and/or audio signal source;

(b) an HMD having a cabled connection to a power supply and to a video and/or audio signal source, embodied as a single physical cable or more than one physical cable;

(c) an HMD having its own video and/or audio signal source (as part of the HMD arrangement) and a cabled connection to a power supply; or (d) an HMD having a wireless connection to a video and/or audio signal source and a cabled connection to a power supply.

If one or more cables are used, the physical position at which the cable enters or joins the HMD is not particularly important from a technical point of view. Aesthetically, and to avoid the cable(s) brushing the user's face in operation, it would normally be the case that the cable(s) would enter or join the HMD at the side or back of the HMD (relative to the orientation of the user's head when worn in normal operation). Accordingly, the position of the cables relative to the HMD in FIG. 1 should be treated merely as a schematic representation.

Accordingly, the arrangement of FIG. 1 provides an example of a head-mountable display system comprising a frame to be mounted onto an observer's head, the frame defining one or two eye display positions which, in use, are positioned in front of a respective eye of the observer and a display element mounted with respect to each of the eye display positions, the display element providing a virtual image of a video display of a video signal from a video signal source to that eye of the observer.

FIG. 1 shows just one example of an HMD. Other formats are possible: for example an HMD could use a frame more similar to that associated with conventional eyeglasses, namely a substantially horizontal leg extending back from the display portion to the top rear of the user's ear, possibly curling down behind the ear. In other (not full immersion) examples, the user's view of the external environment may not in fact be entirely obscured; the displayed images could be arranged so as to be superposed (from the user's point of view) over the external environment. An example of such an arrangement will be described below with reference to FIG. 4.

Figure 2:
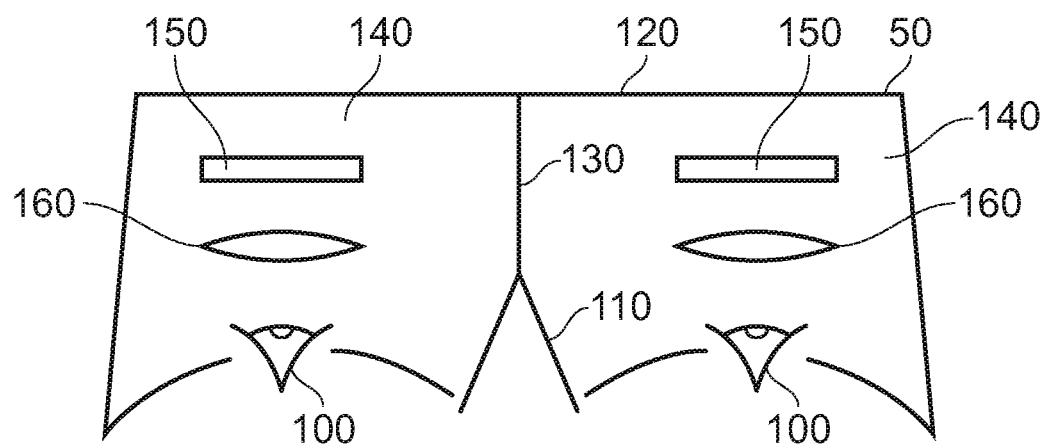
FIG. 2 is a schematic plan view of an HMD.

In the example of FIG. 1, a separate respective display is provided for each of the user's eyes. A schematic plan view of how this is achieved is provided as FIG. 2, which illustrates the positions 100 of the user's eyes and the relative position 110 of the user's nose. The display portion 50, in schematic form, comprises an exterior shield 120 to mask ambient light from the user's eyes and an internal shield 130 which prevents one eye from seeing the display intended for the other eye. The combination of the user's face, the exterior shield 120 and the interior shield 130 form two compartments 140, one for each eye. In each of the compartments there is provided a display element 150 and one or more optical elements 160. The way in which the display element and the optical element(s) cooperate to provide a display to the user will be described with reference to FIG. 3.

Figure 3:
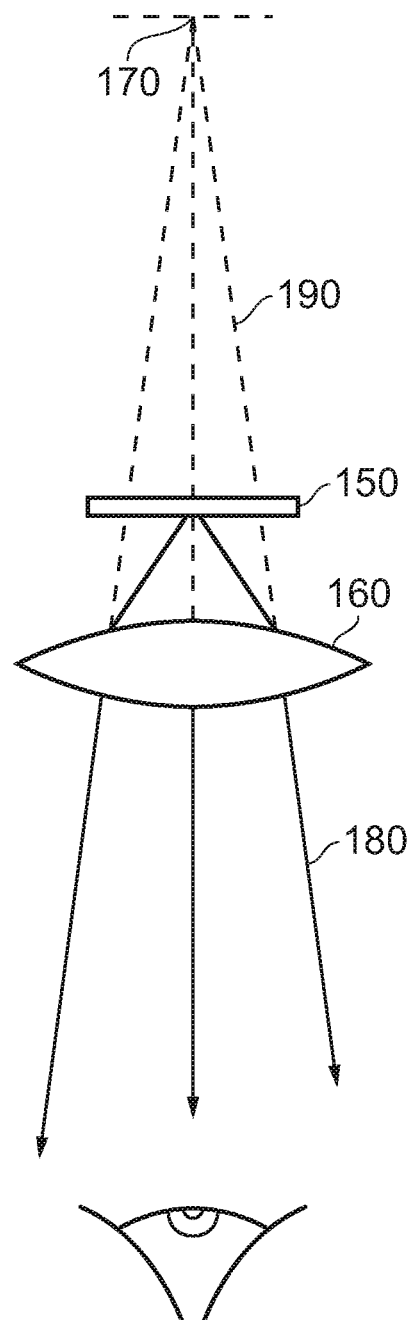
FIG. 3 schematically illustrates the formation of a virtual image by an HMD.

Referring to FIG. 3, the display element 150 generates a displayed image which is (in this example) refracted by the optical elements 160 (shown schematically as a convex lens but which could include compound lenses or other elements) so as to generate a virtual image 170 which appears to the user to be larger than and significantly further away than the real image generated by the display element 150.

As an example, the virtual image may have an apparent image size (image diagonal) of more than 1 m and may be disposed at a distance of more than 1 m from the user's eye (or from the frame of the HMD). In general terms, depending on the purpose of the HMD, it is desirable to have the virtual image disposed a significant distance from the user. For example, if the HMD is for viewing movies or the like, it is desirable that the user's eyes are relaxed during such viewing, which requires a distance (to the virtual image) of at least several metres. In FIG. 3, solid lines (such as the line 180) are used to denote real optical rays, whereas broken lines (such as the line 190) are used to denote virtual rays.

Figure 4:
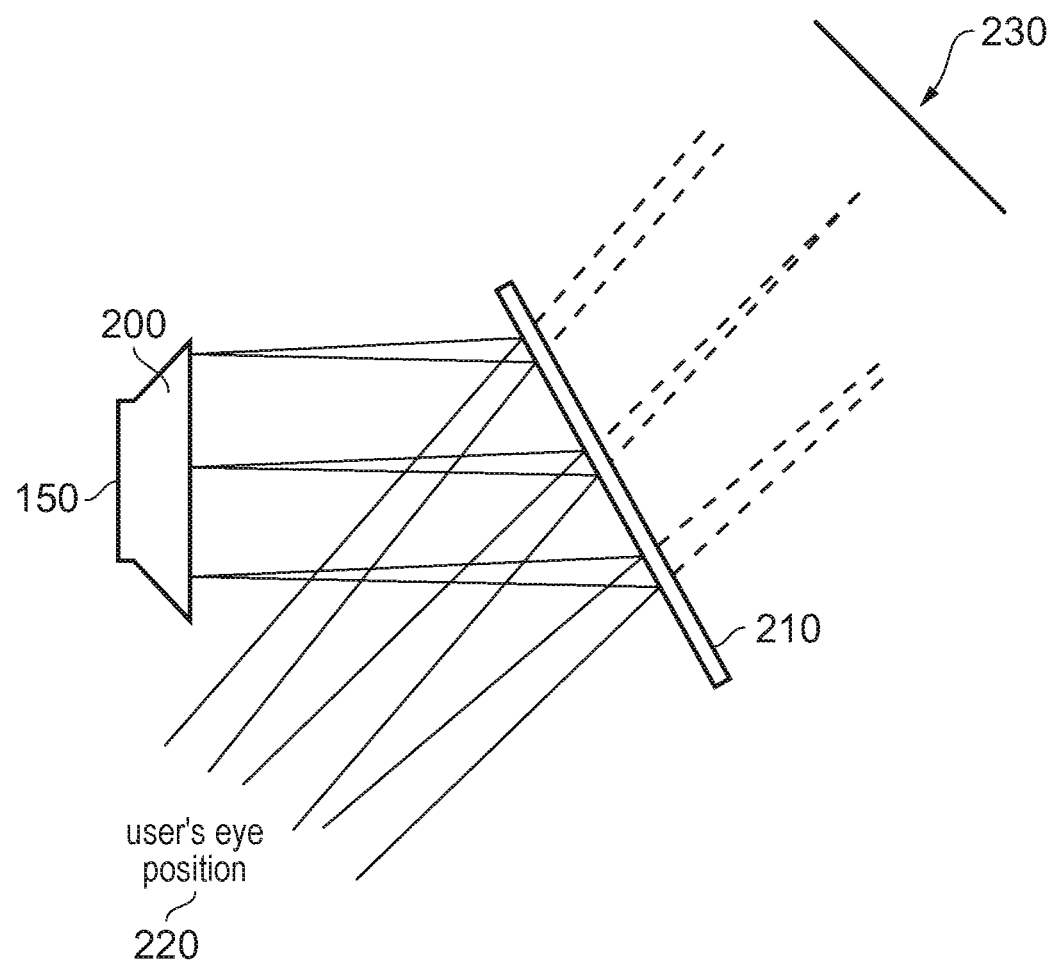
FIG. 4 schematically illustrates another type of display for use in an HMD.

An alternative arrangement is shown in FIG. 4. This arrangement may be used where it is desired that the user's view of the external environment is not entirely obscured. However, it is also applicable to HMDs in which the user's external view is wholly obscured. In the arrangement of FIG. 4, the display element 150 and optical elements 200 cooperate to provide an image which is projected onto a mirror 210, which deflects the image towards the user's eye position 220. The user perceives a virtual image to be located at a position 230 which is in front of the user and at a suitable distance from the user.

In the case of an HMD in which the user's view of the external surroundings is entirely obscured, the mirror 210 can be a substantially 100% reflective mirror. The arrangement of FIG. 4 then has the advantage that the display element and optical elements can be located closer to the centre of gravity of the user's head and to the side of the user's eyes, which can produce a less bulky HMD for the user to wear. Alternatively, if the HMD is designed not to completely obscure the user's view of the external environment, the mirror 210 can be made partially reflective so that the user sees the external environment, through the mirror 210, with the virtual image superposed over the real external environment.

Figure 5:
FIG. 5 schematically illustrates a pair of stereoscopic images.

In the case where separate respective displays are provided for each of the user's eyes, it is possible to display stereoscopic images. An example of a pair of stereoscopic images for display to the left and right eyes is shown in FIG. 5. The images exhibit a lateral displacement relative to one another, with the displacement of image features depending upon the (real or simulated) lateral separation of the cameras by which the images were captured, the angular convergence of the cameras and the (real or simulated) distance of each image feature from the camera position.

Note that the lateral displacements in FIG. 5 could in fact be the other way round, which is to say that the left eye image as drawn could in fact be the right eye image, and the right eye image as drawn could in fact be the left eye image. This is because some stereoscopic displays tend to shift objects to the right in the right eye image and to the left in the left eye image, so as to simulate the idea that the user is looking through a stereoscopic window onto the scene beyond. However, some HMDs use the arrangement shown in FIG. 5 because this gives the impression to the user that the user is viewing the scene through a pair of binoculars. The choice between these two arrangements is at the discretion of the system designer.

In some situations, an HMD may be used simply to view movies and the like. In this case, there is no change required to the apparent viewpoint of the displayed images as the user turns the user's head, for example from side to side. In other uses, however, such as those associated with virtual reality (VR) or augmented reality (AR) systems, the user's viewpoint needs to track movements with respect to a real or virtual space in which the user is located.

As mentioned above, in some uses of the HMD, such as those associated with virtual reality (VR) or augmented reality (AR) systems, the user's viewpoint needs to track movements with respect to a real or virtual space in which the user is located.

This tracking is carried out by detecting motion of the HMD and varying the apparent viewpoint of the displayed images so that the apparent viewpoint tracks the motion. The detection may be performed using any suitable arrangement (or a combination of such arrangements). Examples include the use of hardware motion detectors (such as accelerometers or gyroscopes), external cameras operable to image the HMD, and outwards-facing cameras mounted onto the HMD.

Turning to gaze tracking in such an arrangement, FIG. 6 schematically illustrates two possible arrangements for performing eye tracking on an HMD. The cameras provided within such arrangements may be selected freely so as to be able to perform an effective eye-tracking method. In some existing arrangements, visible light cameras are used to capture images of a user's eyes. Alternatively, infra-red (IR) cameras are used so as to reduce interference either in the captured signals or with the user's vision should a corresponding light source be provided, or to improve performance in low-light conditions.

Figure 6A:
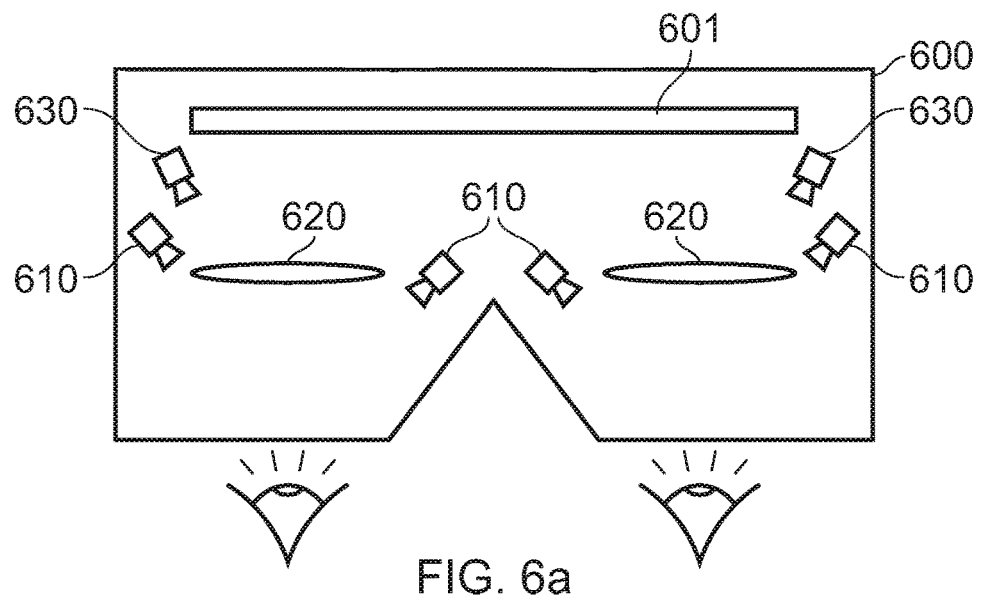
FIG. 6a schematically illustrates a plan view of an HMD.

FIG. 6a shows an example of a gaze tracking arrangement in which the cameras are arranged within an HMD so as to capture images of the user's eyes from a short distance. This may be referred to as near-eye tracking, or head-mounted tracking.

In this example, an HMD 600 (with a display element 601) is provided with cameras 610 that are each arranged so as to directly capture one or more images of a respective one of the user's eyes using an optical path that does not include the lens 620. This may be advantageous in that distortion in the captured image due to the optical effect of the lens is able to be avoided. Four cameras 610 are shown here as examples of possible positions that eye-tracking cameras may provided, although it should be considered that any number of cameras may be provided in any suitable location so as to be able to image the corresponding eye effectively. For example, only one camera may be provided per eye or more than two cameras may be provided for each eye.

However it is considered that in a number of embodiments it is advantageous that the cameras are instead arranged so as to include the lens 620 in the optical path used to capture images of the eye. Examples of such positions are shown by the cameras 630. While this may result in processing being required to enable suitably accurate tracking to be performed, due to the deformation in the captured image due to the lens, this may be performed relatively simply due to the fixed relative positions of the corresponding cameras and lenses. An advantage of including the lens within the optical path may be that of simplifying the physical constraints upon the design of an HMD, for example.

Figure 6B:
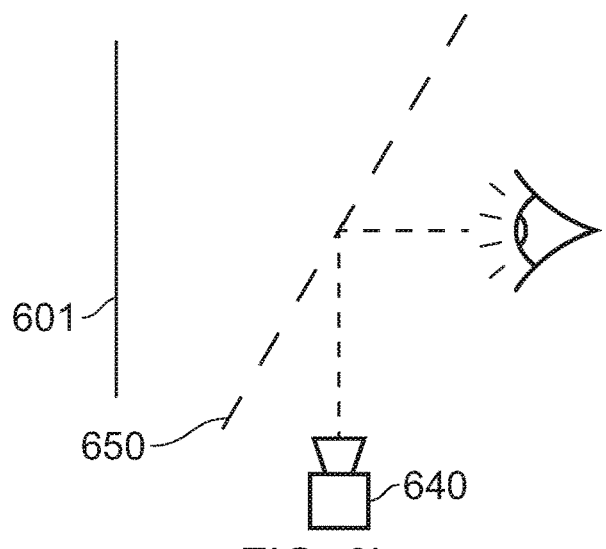
FIG. 6b schematically illustrates a near-eye tracking arrangement.

FIG. 6b shows an example of a gaze tracking arrangement in which the cameras are instead arranged so as to indirectly capture images of the user's eyes. Such an arrangement may be particularly suited to use with IR or otherwise non-visible light sources, as will be apparent from the below description.

FIG. 6b includes a mirror 650 arranged between a display 601 and the viewer's eye (of course, this can be extended to or duplicated at the user's other eye as appropriate). For the sake of clarity, any additional optics (such as lenses) are omitted in this Figure—it should be appreciated that they may be present at any suitable position within the depicted arrangement. The mirror 650 in such an arrangement is selected so as to be partially transmissive; that is, the mirror 650 should be selected so as to enable the camera 640 to obtain an image of the user's eye while the user views the display 601. One method of achieving this is to provide a mirror 650 that is reflective to IR wavelengths but transmissive to visible light—this enables IR light used for tracking to be reflected from the user's eye towards the camera 640 while the light emitted by the display 601 passes through the mirror uninterrupted.

Such an arrangement may be advantageous in that the cameras may be more easily arranged out of view of the user, for instance. Further to this, improvements to the accuracy of the eye tracking may be obtained due to the fact that the camera captures images from a position that is effectively (due to the reflection) along the axis between the user's eye and the display.

Figure 7:
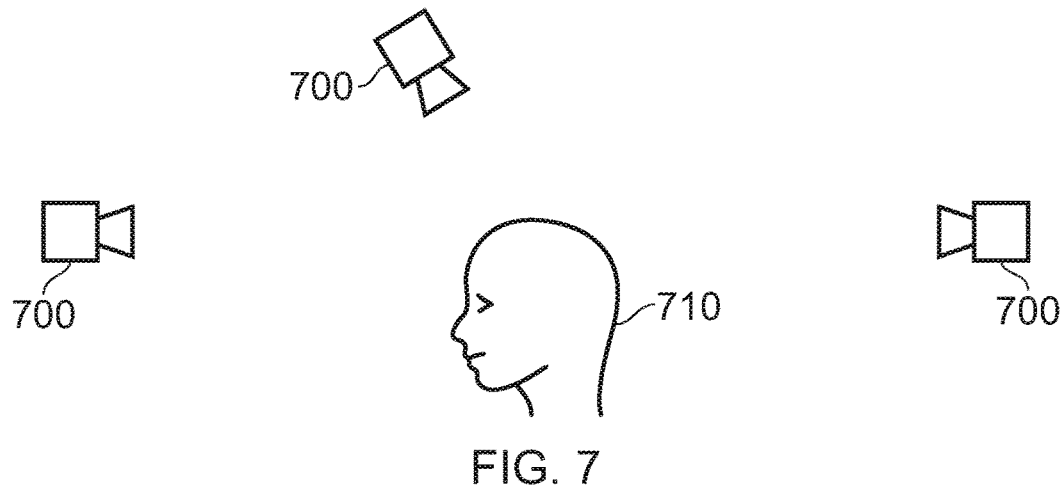
FIG. 7 schematically illustrates a remote tracking arrangement.

Of course, eye-tracking arrangements need not be implemented in a head-mounted or otherwise near-eye fashion as has been described above. For example, FIG. 7 schematically illustrates a system in which a camera is arranged to capture images of the user from a distance; this distance may vary during tracking, and may take any value in dependence upon the parameters of the tracking system. For example, this distance may be thirty centimetres, a metre, five metres, ten metres, or indeed any value so long as the tracking is not performed using an arrangement that is affixed to the user's head.

In FIG. 7, an array of cameras 700 is provided that together provide multiple views of the user 710. These cameras are configured to capture information identifying at least the direction in which a user's 710 eyes are focused, using any suitable method. For example, IR cameras may be utilised to identify reflections from the user's 710 eyes. An array of cameras 700 may be provided so as to provide multiple views of the user's 710 eyes at any given time, or may be provided so as to simply ensure that at any given time at least one camera 700 is able to view the user's 710 eyes. It is apparent that in some use cases it may not be necessary to provide such a high level of coverage and instead only one or two cameras 700 may be used to cover a smaller range of possible viewing directions of the user 710.

Of course, the technical difficulties associated with such a long-distance tracking method may be increased; higher resolution cameras may be required, as may stronger light sources for generating IR light, and further information (such as head orientation of the user) may need to be input to determine a focus of the user's gaze. The specifics of the arrangement may be determined in dependence upon a required level of robustness, accuracy, size, and/or cost, for example, or any other design consideration.

Despite technical challenges including those discussed above, such tracking methods may be considered beneficial in that they allow a greater range of interactions for a user—rather than being limited to HMD viewing, gaze tracking may be performed for a viewer of a television, for instance.

Rather than varying only in the location in which cameras are provided, eye-tracking arrangements may also differ in where the processing of the captured image data to determine tracking data is performed.

Figure 8:
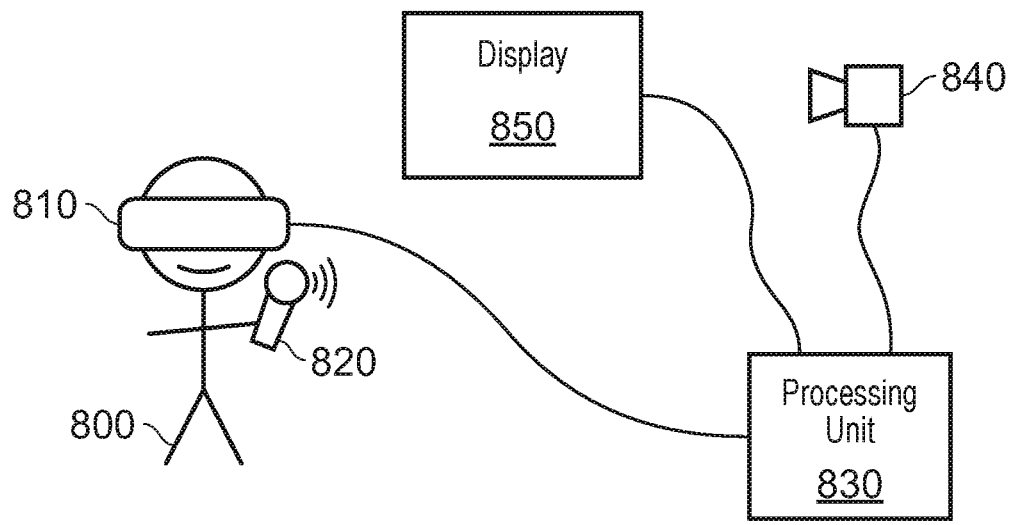
FIG. 8 schematically illustrates a gaze tracking environment.

FIG. 8 schematically illustrates an environment in which an eye-tracking process may be performed. In this example, the user 800 is using an HMD 810 that is associated with the processing unit 830, such as a games console, with the peripheral 820 allowing a user 800 to input commands to control the processing. The HMD 810 may perform eye tracking in line with an arrangement exemplified by FIG. 6a or 6b, for example—that is, the HMD 810 may comprise one or more cameras operable to capture images of either or both of the user's 800 eyes. The processing unit 830 may be operable to generate content for display at the HMD 810; although some (or all) of the content generation may be performed by processing units within the HMD 810.

The arrangement in FIG. 8 also comprises a camera 840, located outside of the HMD 810, and a display 850. In some cases, the camera 840 may be used for performing tracking of the user 800 while using the HMD 810, for example to identify body motion or a head orientation. The camera 840 and display 850 may be provided as well as or instead of the HMD 810; for example these may be used to capture images of a second user and to display images to that user while the first user 800 uses the HMD 810, or the first user 800 may be tracked and view content with these elements instead of the HMD 810. That is to say, the display 850 may be operable to display generated content provided by the processing unit 830 and the camera 840 may be operable to capture images of one or more users' eyes to enable eye-tracking to be performed.

While the connections shown in FIG. 8 are shown by lines, this should of course not be taken to mean that the connections should be wired; any suitable connection method, including wireless connections such as wireless networks or Bluetooth®, may be considered suitable. Similarly, while a dedicated processing unit 830 is shown in FIG. 8 it is also considered that the processing may in some embodiments be performed in a distributed manner—such as using a combination of two or more of the HMD 810, one or more processing units, remote servers (cloud processing), or games consoles.

The processing required to generate tracking information from captured images of the user's 800 eye or eyes may be performed locally by the HMD 810, or the captured images or results of one or more detections may be transmitted to an external device (such as a the processing unit 830) for processing. In the former case, the HMD 810 may output the results of the processing to an external device for use in an image generation process if such processing is not performed exclusively at the HMD 810. In embodiments in which the HMD 810 is not present, captured images from the camera 840 are output to the processing unit 830 for processing.

Figure 9:
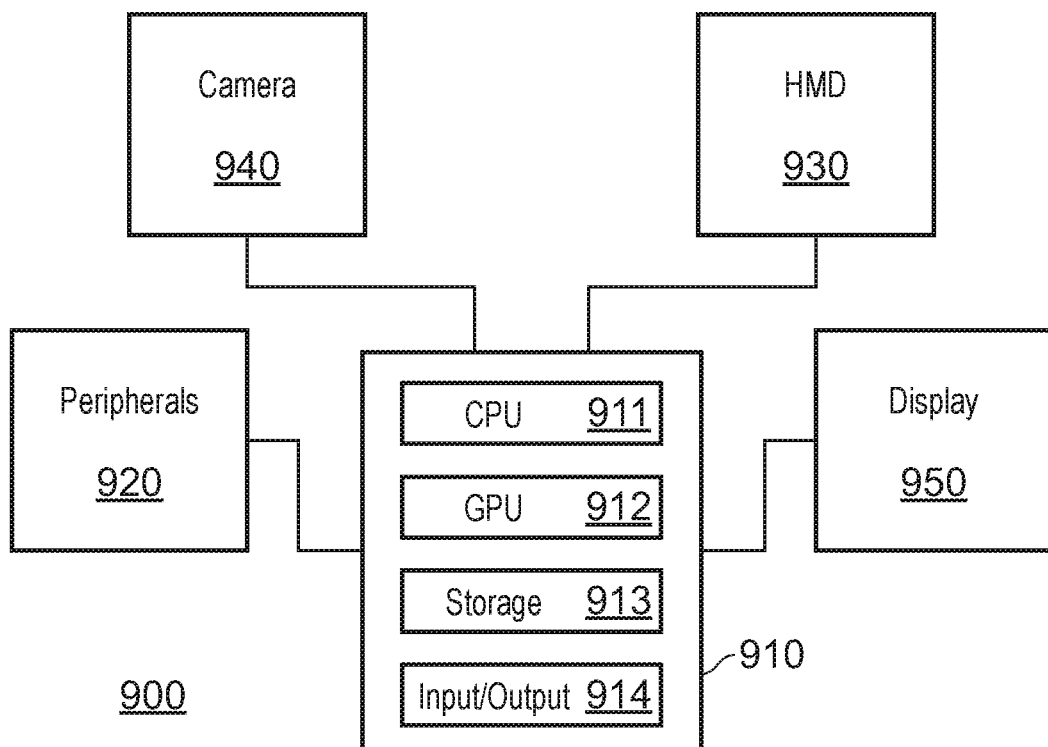
FIG. 9 schematically illustrates a gaze tracking system.

FIG. 9 schematically illustrates a system for performing one or more eye tracking processes, for example in an embodiment such as that discussed above with reference to FIG. 8. The system 900 comprises a processing device 910, one or more peripherals 920, an HMD 930, a camera 940, and a display 950. Of course, not all elements need be present within the system 900 in a number of embodiments—for instance, if the HMD 930 is present then it is considered that the camera 940 may be omitted as it is unlikely to be able to capture images of the user's eyes.

As shown in FIG. 9, the processing device 910 may comprise one or more of a central processing unit (CPU) 911, a graphics processing unit (GPU) 912, storage (such as a hard drive, or any other suitable data storage medium) 913, and an input/output 914. These units may be provided in the form of a personal computer, a games console, or any other suitable processing device.

For example, the CPU 911 may be configured to generate tracking data from one or more input images of the user's eyes from one or more cameras, or from data that is indicative of a user's eye direction. This may be data that is obtained from processing images of the user's eye at a remote device, for example. Of course, should the tracking data be generated elsewhere then such processing would not be necessary at the processing device 910.

The GPU 912 may be configured to generate content for display to the user on which the eye tracking is being performed. In some embodiments, the content itself may be modified in dependence upon the tracking data that is obtained—an example of this is the generation of content in accordance with a foveal rendering technique. Of course, such content generation processes may be performed elsewhere—for example, an HMD 930 may have an on-board GPU that is operable to generate content in dependence upon the eye tracking data.

The storage 913 may be provided so as to store any suitable information. Examples of such information include program data, content generation data, and eye tracking model data. In some cases, such information may be stored remotely such as on a server, and as such a local storage 913 may not be required—the discussion of the storage 913 should therefore be considered to refer to local (and in some cases removable storage media) or remote storage.

The input/output 914 may be configured to perform any suitable communication as appropriate for the processing device 910. Examples of such communication include the transmission of content to the HMD 930 and/or display 950, the reception of eye-tracking data and/or images from the HMD 930 and/or the camera 940, and communication with one or more remote servers (for example, via the internet).

As discussed above, the peripherals 920 may be provided to allow a user to provide inputs to the processing device 910 in order to control processing or otherwise interact with generated content. This may be in the form of button presses or the like, or alternatively via tracked motion to enable gestures to be used as inputs.

The HMD 930 may comprise a number of sub-elements, which have been omitted from FIG. 9 for the sake of clarity. Of course, the HMD 930 should comprise a display unit operable to display images to a user. In addition to this, the HMD 930 may comprise any number of suitable cameras for eye tracking (as discussed above), in addition to one or more processing units that are operable to generate content for display and/or generate eye tracking data from the captured images.

The camera 940 and display 950 may be configured in accordance with the discussion of the corresponding elements above with respect to FIG. 8.

Turning to the image capture process upon which the eye tracking is based, examples of different cameras are discussed. The first of these is a standard camera, which captures a sequence of images of the eye that may be processed to determine tracking information. The second is that of an event camera, which instead generates outputs in accordance with observed changes in brightness.

It is more common to use standard cameras in such tracking arrangements, given that they are widely available and often relatively cheap to produce. 'Standard cameras' here refer to cameras which capture images of the environment at predetermined intervals which can be combined to generate video content. For example, a typical camera of this type may capture thirty images (frames) each second, and these images may be output to a processing unit for feature detection or the like to be performed so as to enable tracking of the eye.

Such a camera comprises a light-sensitive array that is operable to record light information during an exposure time, with the exposure time being controlled by a shutter speed (the speed of which dictates the frequency of image capture). The shutter may be configured as a rolling shutter (line-by-line reading of the captured information) or a global shutter (reading the captured information of the whole frame simultaneously), for example.

However, in some arrangements it may be considered advantageous to instead use an event camera, which may also be referred to as a dynamic vision sensor. Such cameras do not require a shutter as described above, and instead each element of the light-sensitive array (often referred to as a pixel) is configured to output a signal at any time a threshold brightness change is observed. This means that images are not output in the traditional sense—however an image reconstruction algorithm may be applied that is able to generate an image from the signals output by an event camera.

While there is an increased computational complexity for generating an image from such data, the output of the event camera can be used for tracking without any image generation. One example of how this is performed is that of using an IR-sensitive event camera; when imaged using IR light, the pupil of the human eye displays a much higher level of brightness than the surrounding features. By selecting an appropriate threshold brightness, the motion of the pupil would be expected to trigger events (and corresponding outputs) at the sensor.

Independent of the type of camera that is selected, in many cases it may be advantageous to provide illumination to the eye in order to obtain a suitable image. One example of this is the provision of an IR light source that is configured to emit light in the direction of one or both of the user's eyes; an IR camera may then be provided that is able to detect reflections from the user's eye in order to generate an image. IR light may be preferable as it is invisible to the human eye, and as such does not interfere with normal viewing of content by the user, but it is not considered to be essential. In some cases, the illumination may be provided by a light source that is affixed to the imaging device, while in other embodiments it may instead be that the light source is arranged away from the imaging device.

Figure 10:
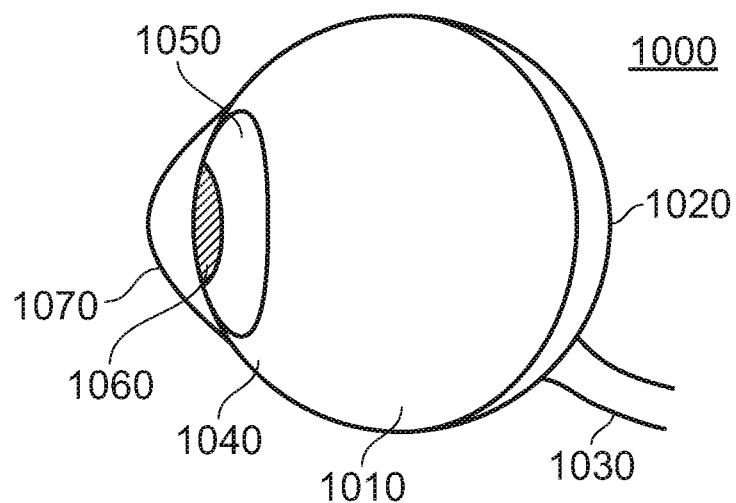
FIG. 10 schematically illustrates a human eye.

As suggested in the discussion above, the human eye does not have a uniform structure; that is, the eye is not a perfect sphere, and different parts of the eye have different characteristics (such as varying reflectance or colour). FIG. 10 shows a simplified side view of the structure of a typical eye 1000; this Figure has omitted features such as the muscles which control eye motion for the sake of clarity.

The eye 1000 is formed of a near-spherical structure filled with an aqueous solution 1010, with a retina 1020 formed on the rear surface of the eye 1000. The optic nerve 1030 is connected at the rear of the eye 1000. Images are formed on the retina 1020 by light entering the eye 1000, and corresponding signals carrying visual information are transmitted from the retina 1020 to the brain via the optic nerve 1030.

Turning to the front surface of the eye 1000, the sclera 1040 (commonly referred to as the white of the eye) surrounds the iris 1050. The iris 1050 controls the size of the pupil 1060, which is an aperture through which light enters the eye 1000. The iris 1050 and pupil 1060 are covered by the cornea 1070, which is a transparent layer which can refract light entering the eye 1000. The eye 1000 also comprises a lens (not shown) that is present behind the iris 1050 that may be controlled to adjust the focus of the light entering the eye 1000.

Figure 11:
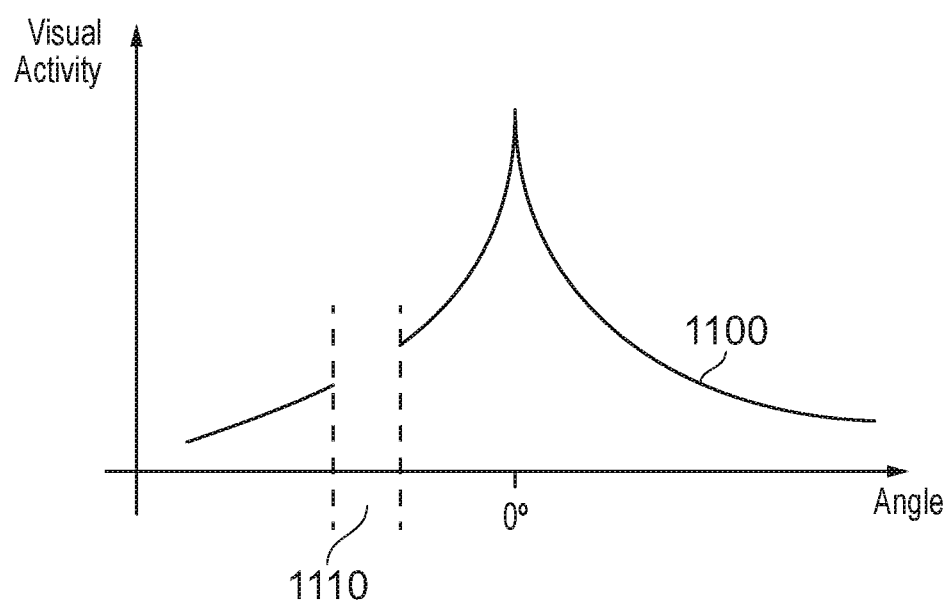
FIG. 11 schematically illustrates a graph of human visual acuity.

The structure of the eye is such that there is an area of high visual acuity (the fovea), with a sharp drop off either side of this. This is illustrated by the curve 1100 of FIG. 11, with the peak in the centre representing the foveal region. The area 1110 is the 'blind spot'; this is an area in which the eye has no visual acuity as it corresponds to the area where the optic nerve meets the retina. The periphery (that is, the viewing angles furthest from the fovea) is not particularly sensitive colour or detail, and instead is used to detect motion.

As has been discussed above, foveal rendering is a rendering technique that takes advantage of the relatively small size (around 2.5 degrees) of the fovea and the sharp fall-off in acuity outside of that.

The eye undergoes a large amount of motion during viewing, and this motion may be categorised into one of a number of categories.

Saccades, and on a smaller scale micro-saccades, are identified as fast motions in which the eyes rapidly move between different points of focus (often in a jerky fashion). This may be considered as ballistic motion, in that once the movement has been initiated it cannot be altered. Saccades are often not conscious eye motions, and instead are performed reflexively to survey an environment. Saccades may last up to two hundred milliseconds, depending on the distance rotated by the eye, but may be as short as twenty milliseconds. The speed of a saccade is also dependent upon the total rotation angle; typical speeds may be between two hundred and five hundred degrees per second.

'Smooth pursuit' refers to a slower movement type than a saccade. Smooth pursuit is generally associated with a conscious tracking of a point of focus by a viewer, and is performed so as to maintain the position of a target within (or at least substantially within) the foveal region of the viewer's vision. This enables a high-quality view of a target of interest to be maintained in spite of motion. If the target moves too fast, then smooth pursuit may instead require a number of saccades in order to keep up; this is because smooth pursuit has a lower maximum speed, in the region of thirty degrees per second.

The vestibular-ocular reflex is a further example of eye motion. The vestibular-ocular reflex is the motion of the eyes that counteracts head motion; that is, the motion of the eyes relative to the head that enables a person to remain focused on a particular point despite moving their head.

Another type of motion is that of the vergence accommodation reflex. This is the motion that causes the eyes to rotate to converge at a point, and the corresponding adjustment of the lens within the eye to cause that point to come into focus.

Further eye motions that may be observed as a part of a gaze tracking process are those of blinks or winks, in which the eyelid covers the eyes of the user. Such motions may be reflexive or intentional, and can often interfere with eye tracking as they will obscure vision of the eye, and the eye is often not stationary during such a motion.

As discussed above, many eye tracking arrangements are provided as a part of a head-mountable arrangement as worn by a user during use; an example of this is the use of eye tracking arrangements within an HMD to control or otherwise interact with the displayed content. This may be advantageous in that the proximity of sensors to the user's eyes can lead to an improved detection of the user's eye motion, for example, although there are also a number of drawbacks that may be encountered.

One such drawback is that of the detectors used to perform the eye tracking being subject to forces associated with user movement. Such a problem is not encountered by standalone eye tracking solutions (such as those relying on cameras located away from the user), as there is no physical contact. However, when using sensors as part of a head-mountable arrangement it is possible for the user's head motion to cause the head-mounted arrangement to move independent of the user's head. For example, a forceful rotation of the user's head may cause the head-mounted arrangement to slip or otherwise move.

In some cases, this motion may be due to insufficient friction being generated between the user's skin and the contacting portions of the head-mountable arrangement during use. Alternatively, or in addition, this may be caused by the use of soft materials (such as a foam material) to form the contacting portions for user comfort; these may compress during motion, which can cause a head-mounted arrangement to have a motion relative to the user's head. Other factors may also contribute to the movement of a head-mounted arrangement relative to the user's head, and the arrangement discussed within may be configured to detect or otherwise identify such movement independent of the contributing factors.

Figure 12A:
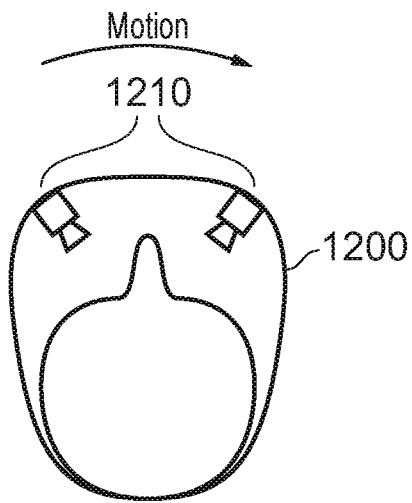
FIGS. 12A and 12B schematically illustrate an example of relative motion between a head-mounted system and a user's head.
Figure 12B:
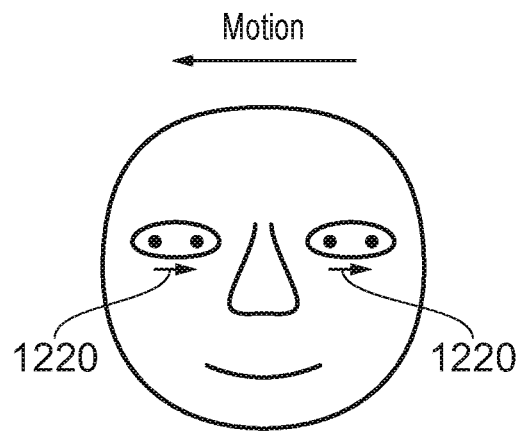

The motion of the head-mountable arrangement may be considered problematic in that it can be misinterpreted as eye motion. FIG. 12A schematically illustrates an example of this, in which the headset 1200 moves in a clockwise direction (as seen from above) relative to the user's head. FIG. 12B shows an example of the apparent eye motion, although the rest of the features of the user's face are shown as stationary to aid the clarity of the Figure.

While the user's eyes don't move in FIG. 12B, the changed position of the cameras 1210 associated with the headset cause an apparent pupil motion indicated by the arrows 1220. Of course, the change in relative location of the user's eyes and the cameras 1210 would be expected to cause a distortion in captured images due to the change in angle but this is omitted from FIG. 12 for the sake of clarity.

If this apparent change in the position of the pupils is interpreted as an actual change in the position of the pupils, then this is likely to lead to erroneous inputs to a computer program (such as a game). This can lead to mis-controlling an in-game character, for example, or an incorrect region being identified for high-resolution display in a foveal rendering process.

In order to identify head-mounted arrangement motion relative to the user's head, a determination of the direction and/or magnitude of the head-mounted arrangement motion are desirable. While it may be more accurate to model the motion as a rotation, for smaller motions (such as rotations of a few degrees or less) it may be sufficient to model the motion as a translation as this may simplify any calculations that are to be performed.

The direction of the motion may be characterised in a simplified manner, such as 'up', 'down', 'clockwise', or 'anticlockwise', or may instead be characterised in a more precise manner using a vector notation or the like. Of course, the granularity of the direction and the associated notation can be selected freely to be suitable for the intended application.

Similarly, the magnitude of the motion may be determined in accordance with any suitable requirement; for instance, a binary determination of a threshold amount of motion may be recorded, or a particular value representing the motion may be determined. In some embodiments this motion is to be detected using one or more sensors, while in others the motion may be predicted or otherwise derived from other measurements or models—of course, a combination of these approaches may be considered suitable in some cases.

Figure 13:
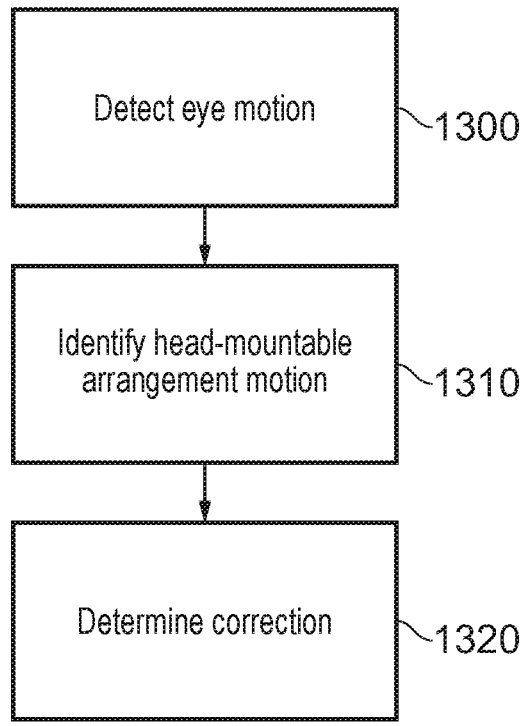
FIG. 13 schematically illustrates a method for tracking one or both of a user's eyes using a head-mountable eye-tracking arrangement.

FIG. 13 schematically illustrates a method for tracking one or both of a user's eyes using a head-mountable eye-tracking arrangement. In particular, this process includes performing a modification to the detected eye motion (or an associated input generated in dependence upon this detected motion) in accordance with embodiments of the present disclosure.

A step 1300 comprises detecting motion of one or both of the user's eyes. It is generally considered that this detection is performed using an infra-red camera arrangement, however any suitable arrangement may be compatible with the teachings of the present disclosure; the only requirement of the eye motion detection arrangement is that of being head-mountable.

Of course, the detection in step 1300 is effectively a detection of the motion (translation and/or rotation) of the user's eye or eyes relative to the sensors performing the detection. It is therefore apparent that any detection may comprise a component which is entirely eye motion, and a component which is due to the motion of the head-mountable arrangement (and therefore sensor) relative to the user's head. These components are often difficult to separate without further information to characterise the detected motion correctly.

A step 1310 comprises identifying motion of the head-mountable arrangement relative to the user's head. Examples of this identification are discussed below; as noted above, this identification may comprise any number of detections or inferences about motion of the head-mountable arrangement. That is to say that one or more detections of the motion of the arrangement may be performed, and/or one or more detections of the user's head.

A step 1320 comprises determining a correction to the eye tracking process in dependence upon the identified motion of the user's head relative to the head-mountable arrangement. That is to say that a correction is identified that may be applied to the result of the detection in step 1300 (or a corresponding input that is generated in dependence upon that motion), in accordance with any identified motion in step 1310. The step 1330 may further comprise applying the determined correction to the eye tracking process, including applying a correction to the detected eye motion or a generated input generated in dependence upon the detected eye motion.

For example, a detected eye motion may have a modification applied to its direction and/or magnitude, or may be ignored altogether. This correction may be applied to the detection associated with each tracked eye independently, in some examples, such that the left eye and the right eye tracking may be modified by different amounts (this may be advantageous in a scenario in which the head-mountable arrangement is flexible or otherwise able to move by different amounts in different locations). In some cases, a modifier is instead applied to an input that is generated for an application or the like based upon a detected eye motion, rather than correcting the detected motion itself.

Figure 14:
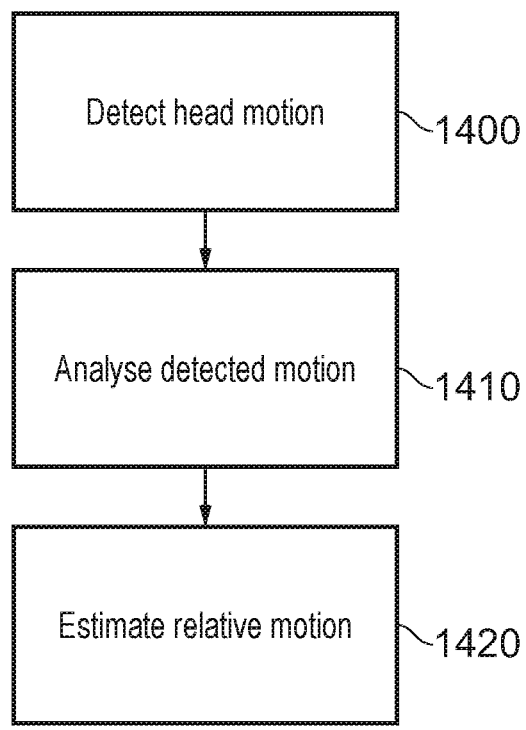
FIGS. 14 and 15 schematically illustrate exemplary motion identification processes.
Figure 15:
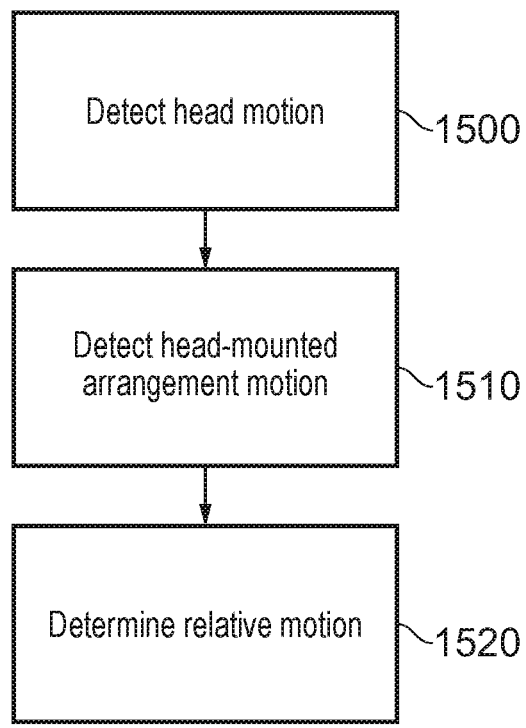

FIGS. 14 and 15 schematically illustrate exemplary processes that may form the step 1310 of FIG. 13. The processes in FIGS. 14 and 15 may be implemented individually or in combination, as appropriate for the particular arrangement with which the method of FIG. 13 is implemented.

FIG. 14 shows an exemplary process in which a detection of head motion is performed, and this is used to determine an expected or predicted relative motion between a head-mounted arrangement and the user's head.

At a step 1400, a detection of the user's head motion is performed. This detection may be performed using image-based techniques, for example, or sensor-based techniques; it is envisaged that in some arrangements, both (or indeed other, such as audio-based location) detections may be performed. In some embodiments, a detection of the motion of the head itself is performed, while in others a detection of the motion of the head-mounted arrangement that is being used is performed.

For example, in some embodiments a camera is arranged so as to be able to capture images of at least the user's head within the environment. A set of time-sequential captured images may be compared to one another to detect motion, using any suitable image processing technique—such a detection process may be enhanced by the provision of one or more detectable elements (such as AR markers or LED arrangements) on the user's head or the head-mounted arrangement. An example of such an arrangement is that of the use of the head-mountable arrangement with a games console, with a camera located at the games console being operable to capture images of the user and/or head-mounted arrangement during gameplay.

Alternatively, or in addition, one or more sensors may be associated with the user's head and/or the head-mountable arrangement. Examples of such sensors include inertial sensors such as gyroscopes and accelerometers, although it should be understood that any suitable sensors or sensor arrangements may be appropriate.

At a step 1410, the detected motion is analysed so as to characterise the motion. This may include performing any suitable processing so as to identify one or more characteristics of the motion, such as direction, acceleration, speed, and/or duration.

At a step 1420, one or more characteristics of the motion are used to infer or otherwise estimate the motion of the head-mounted arrangement relative to the user's head. This may be based on any of a number of suitable considerations; a selection of these are discussed below, but these should not be regarded as limiting as it is considered that any number of considerations may be taken into account in determining head-mounted arrangement motion relative to the user's head.

A first potential consideration may be that of that of the physical characteristics of the head-mountable arrangement. For example, based upon information about the materials used in constructing the arrangement and/or other characteristics (such as weight, weight distribution, size and/or shape) of the head-mountable arrangement it may be possible to determine an amount of motion relative to the user's head.

For instance, it may be possible to identify the force that is generated upon the head-mounted arrangement during a head motion (based upon the size and weight distribution, for example). This may be indicative of an expected amount of motion of the head-mounted arrangement relative to the user's head; for example, a larger force may correspond to a larger relative motion. The determination of such a correspondence can be performed in any suitable method as determined by the skilled person—for instance, tests may be performed (either as a specific user calibration, or in a separate testing process) to identify a correlation, and one or more physical characteristics of the device may be considered to assist in quantifying the expected relative motion.

In a number of head-mountable arrangements, one or more deformable elements may be provided as padding between the harder components and the user's head—this may be to make for a more comfortable fit, for example. The deformable element may respond to head motion by being deformed (for example, due to the weight of the head-mountable arrangement); while the contact area may remain stationary on the user's face, this may cause one or more hardware components (such as the eye-tracking detectors) to move relative to the user's head. For instance, if a user moves their head sharply to the right, it is considered that the forces generated may cause any deformable elements on the right-hand side of the device to be compressed while those on the left-hand side may experience a lower force than when stationary and subsequently de-compress. This would cause a relative shift of the head-mounted arrangement which would appear to be a rotation of the arrangement relative to the head. This is one example of how a deformable contact element may lead to a relative motion between the user's head and the head-mounted arrangement.

It is therefore considered that it may be desirable to develop a model that is able to determine or estimate the relative motion of the hardware elements for a given detected head motion. Such a model may be based upon information about the deformable element or elements such as size, shape, and/or resilience, for instance—although any relevant information or characteristics may be considered.

Similarly, any contact areas between the user's head and the head-mounted arrangement may also be considered useful to model. For example, the amount of friction generated at each of the contact areas (dependent on materials and the forces applied, for instance) may have an impact on the relative motion due to slipping or the like. Such forces and physical characteristics of the user's head and/or the arrangement may therefore be considered.

A generated model may also be designed so as to use detected eye motion as an input. In its simplest case, this may mean that if an eye motion is detected that is larger than the physical range of the user's eye then it can be inferred that the head-mounted arrangement has moved relative to the user's head and that a recalibration or reset is required.

In a more complex case, the model may be designed such that an expected relative head motion is identified for a particular magnitude and/or direction of eye motion. For example, a user that moves their eyes to view an object (real or virtual) in their periphery will usually also move their head, as this enables the object to be brought into the foveal region more quickly. By detecting the magnitude of eye motion, and the acceleration, it may be possible to estimate the head motion and an expected motion of the head-mounted arrangement relative to the user's head.

Models may also be used in combination with any suitable methods so as to predict future relative motion. For example, if a relative motion of a particular direction and magnitude is detected, it may be assumed in some cases that there will be a corresponding elastic motion (for example, when deformable elements regain their original shape). Similarly, models may be generated so as to predict motion based upon in-game content or the like so as to identify stimuli or likely actions, and to pre-calculate an expected relative motion were such any of the stimuli to be acted upon.

For example, if it is known that an enemy will appear in a particular location, it is envisaged that user motion in response to that enemy appearing could be modelled. With knowledge of that expected motion, it may be possible to determine a likely relative motion associated with the motion. By calculating this in advance, a correction may be applied to the eye tracking process with a lower latency.

Of course, a calibration process may be performed so as to capture user-specific data that can be input into any of suitable models for determining the relative motion. This can factor in variance resulting from differences in user head size or specifics of the motions performed, for instance. Similarly, other factors such as skin elasticity and hairiness in contact regions with the head-mounted arrangement may lead to further variation in the relative motion experienced by different users performing the same (or a substantially similar) head motion. Alternatively, these factors can be estimated based upon images of the user, or one or more other inputs (such as age or gender) which can be used to predict these factors.

FIG. 15 shows an exemplary process in which a detection of motion of a head-mounted arrangement relative to the user's head is performed. As discussed above, such a process comprises a detection of the relative motion, rather than solely a detection of another quantity (such as head motion) and an estimation or prediction of the relative motion.

At a step 1500, an optional step of detecting head motion of the user is performed. As described in step 1400 of FIG. 14 above, this may comprise any suitable head-tracking process.

At a step 1510, a detection of the motion of the head-mounted arrangement is performed. In some examples, this is a detection of the motion of the head-mount arrangement relative to the environment, while in other cases it may be a detection relative to the user's head; it is considered that a combined approach may be taken in which both detections are performed, and/or multiple detections of either/both are performed, so as to increase the accuracy and/or precision of the measurements.

A detection of the motion of the head-mounted arrangement relative to the environment may be performed in any suitable manner. A first example is that of camera-based tracking, such as an inside-out or outside-in tracking method in which cameras are operable to capture images of the environment or headset (respectively) and these images are used to derive the motion of the headset using image processing techniques. A second example is that of hardware motion detectors, such as gyroscopes and accelerometers, which are operable to detect motion of the head-mounted arrangement during use. Such sensors may also be used for generating inputs to an associated program or game that is being executed, or may be provided solely for tracking purposes.

A detection of the motion of the head-mounted arrangement relative to the user's head may be performed in a number of different ways, either alone or in combination with one another. A number of exemplary detections are described below.

A first example is that of the use of additional cameras (or additional detections using existing cameras) that are configured to capture images of elements that should remain stationary during use, such that any detected motion of those elements should be interpreted as a relative motion of the head-mounted arrangement. Of course, the elements could instead be expected to be only substantially stationary, such that an above-threshold motion is instead the condition for determining whether there is relative head-mounted arrangement motion. An example of a natural feature that may be appropriate is that of a user's eyebrows or nose, which should experience limited motion during use. An artificial feature may instead be tracked, of course—such as a marker or other trackable pattern applied to the user's skin which is viewable by a camera.

An alternative, or additional, example is that of the use of one or more shear sensors within the head-mountable arrangement. When in use, such sensors may be in contact with the user's skin and are operable to detect any shearing motion applied to the sensors; these may be implemented using a piezoelectric-based arrangement, for example. When correctly configured, the shear sensors would be expected to register a signal when there is a transverse force along the sensor surface. That is, the sensors would be configured to register a signal only when there is motion of the head-mounted arrangement relative to the user's head as this is the most likely source of shear forces within such an arrangement.

Similar detection hardware may also be employed to detect the compression of one or more deformable elements that are provided as a part of the head-mountable arrangement. An example of a suitable detector may be a capacitance-based detector that has a plate on (or near) the ends of the deformable element closest to the user's head and the head-mountable unit respectively during use. A compression of the deformable element would be expected to result in a decrease in the distance between the capacitive elements and therefore a change in the capacitance of the arrangement. This change may be detected using any suitable electronic arrangement.

In some arrangements, it is considered that a vibration sensor may offer an insight into the motion of a head-mounted arrangement relative to the user's head. Such sensors are often implemented as piezoelectric-based arrangements, but any arrangement may be suitable so long as it is capable of detecting vibrations. Detection of vibrations may be considered to be considered to be indicative of a motion of the head-mounted arrangement relative to the user's head in that when both move together, this is likely to be a smooth motion. However, due to the friction between the user's skin and the skin-contacting elements of the head-mounted arrangement it is likely that a less-smooth force will be generated when the arrangement moves independently of the head. The magnitude, duration, or profile of the detected vibrations may be indicative of the amount of relative motion that is experienced.

At a step 1520, the one or more detections are analysed to determine the magnitude and/or direction of the relative motion between the head-mounted arrangement and the user's head. The results of this analysis may be used to provide a correction or other modification to the eye-tracking process or inputs to an application or the like.

In some embodiments, a combined method may be implemented in which the approaches of both FIGS. 14 and 15 are utilised. That is, one or more detections and predictions/estimations of the relative motion may each be performed—this can be used to increase the accuracy or precision of the determination process, for example.

Figure 16:
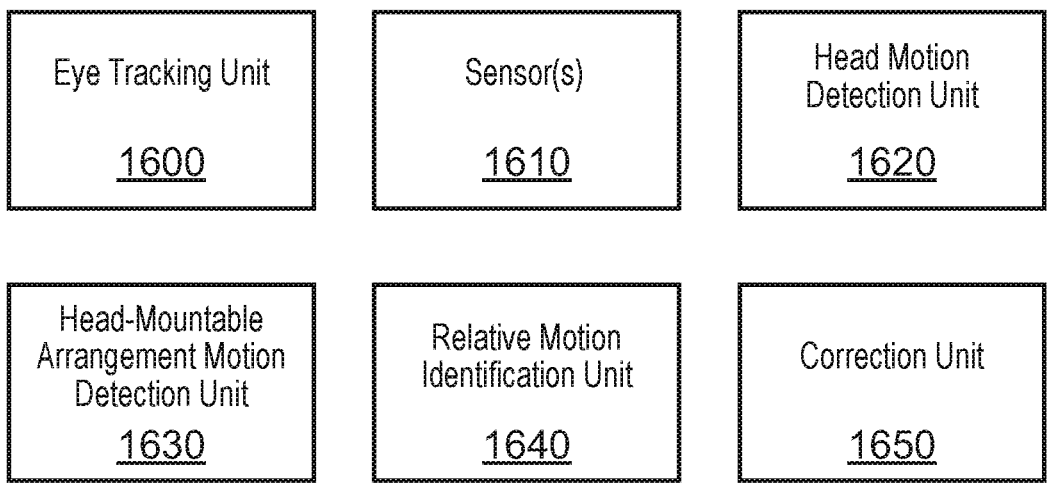
FIG. 16 schematically illustrates a system for tracking one or both of a user's eyes using a head-mountable eye-tracking arrangement.

FIG. 16 schematically illustrates a hardware arrangement that is configured to perform any of the methods described above. The system shown in FIG. 16 is an example of a system that is configured to track one or both of a user's eyes using a head-mountable eye-tracking arrangement, and in particular is operable to apply a correction to the detection and/or one or more inputs to a system generated in dependence upon those detections. The system of FIG. 16 comprises an eye tracking unit 1600, one or more sensors 1610, an optional head motion detection unit 1620, an optional head-mountable arrangement motion detection unit 1630, a relative motion identification unit 1640, and a correction unit 1650.

In some embodiments the head-mountable arrangement is a head-mountable display unit, although it is not necessary that such a display is required—for example, the eye tracking may be performed for generating inputs for a process with no display or an external display (such as inputs to a computer with a typical monitor arrangement rather than a head-mountable display arrangement).

The eye tracking unit 1600, located on the head-mountable arrangement, is operable to detect motion of one or both of the user's eyes. The eye tracking unit 1600 may comprise any suitable detectors for tracking eye motion, such as those described above. In some embodiments, an infra-red camera is provided (along with an infra-red light source) to enable tracking of each eye independently.

The sensors 1610 may comprise any one or more of the sensors described above, or indeed any suitable sensor for generating information that can be used to identify relative motion of the head-mountable arrangement. The sensors 1610 are operable to detect one or both of motion of the user's head and motion of the head-mountable arrangement. Examples of such sensors include cameras, shear sensors, capacitive sensors, vibration sensors, accelerometers, and gyroscopes. The sensors 1610 may be arranged at any suitable location, such as on the head-mountable arrangement and/or at a games console or other processing device associated with the arrangement. Examples of suitable sensors include one or more of a shear sensor, one or more cameras for tracking predetermined features, capacitive sensors, and/or a vibration sensor; in some embodiments, more than one of any of these sensors may be provided in any suitable configuration.

The optional head motion detection unit 1620 is operable to detect motion of the user's head, separate to the motion of the head-mounted unit. As discussed above, any number of suitable camera-based or other motion tracking arrangements may be implemented for such a purpose, and the head motion detection unit 1620 is operable to determine at least a magnitude and/or a direction of the motion of the user's head in dependence upon the information provided by such arrangements.

The optional head-mountable arrangement motion detection unit 1630 is operable to detect motion of the head-mountable arrangement. As noted above, this may comprise a detection of the head-mountable arrangement relative to the environment, or relative to the wearer's head. Such a detection is generally considered to be indicative of the motion of the eye tracking unit 1600; while there may not be a one-to-one mapping between the respective motions, due to flexibility of the arrangement or the like, it is considered that it is possible to provide a correction to the eye tracking process in dependence upon the identified motion of the head-mountable arrangement.

The relative motion identification unit 1640 is operable to identify motion of the head-mountable arrangement relative to the user's head based upon one or more inputs such as estimations and/or detections. In some embodiments, this simply comprises the obtaining of information from a detector (such as a shear sensor) which directly measures such motion, and performing any desired processing to enhance or correct the measurements. Alternatively, or in addition, this may comprise a determination of the difference between a detected head motion and a detected head-mountable arrangement motion.

Alternatively, or in addition, the relative motion identification unit 1640 is operable to input one or more measurements into a model used to predict or estimate relative motion between the head-mountable arrangement and the user's head, and to use the predicted or estimated relative motion as the identified motion.

In some embodiments, the relative motion identification unit 1640 is operable to identify two or more values for the relative motion each corresponding to different respective methods of determining the relative motion. These values may be used to determine a refined value of the relative motion, for example, or simply to confirm that a measurement is accurate.

As noted above, in some embodiments the relative motion identification unit 1640 is also (or alternatively) operable to identify an expected relative motion in dependence upon content to be displayed to a user via a display device.

The correction unit 1650 is operable to apply a correction to the detected motion of the one or both of the user's eyes in dependence upon the identified motion of the user's head relative to the head-mountable arrangement. In some embodiments, the correction unit 1650 is operable to modify the results of a detection of the user's eye position in dependence upon the determined correction, and may be further operable to apply a correction to each of the user's eyes individually.

The correction unit 1650 may also (or instead) be operable to generate a modified input to an application in dependence upon the determined correction. For example, such a modification may comprise using the eye tracking data to select an input, and then subsequently applying a modifier (such as a magnitude scaling or directional modification) directly to that input in dependence upon the determined correction.

The arrangement of FIG. 16 is an example of a computer hardware (for example, with processing performed by a GPU and/or CPU located in a games console or any other computing device) that is operable, in conjunction with one or more cameras and/or sensors, to track one or both of a user's eyes using a head-mountable eye-tracking arrangement, and in particular is operable to:

detect motion of one or both of the user's eyes;
identify motion of the head-mountable arrangement relative to the user's head; and
determine a correction to the eye tracking process in dependence upon the identified motion of the user's head relative to the head-mountable arrangement.

Of course, it should be understood that the processing for implementing such a process may be distributed in any suitable manner, including performing parts of the processing respectively at a games console and at the head-mountable eye-tracking arrangement, for example.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses.

1. A system configured to perform an eye tracking process using a head-mountable eye-tracking arrangement, the system comprising:
   an eye tracking unit, located on the head-mountable arrangement, operable to detect motion of one or both of the user's eyes;
   a relative motion identification unit operable to identify motion of the head-mountable arrangement relative to the user's head; and
   a correction unit operable to determine a correction to the eye tracking process in dependence upon the identified motion of the user's head relative to the head-mountable arrangement.

2. A system according to clause 1, the system comprising one or more sensors operable to detect one or both of motion of the user's head and motion of the head-mountable arrangement.

3. A system according to clause 2, wherein the sensors include one or more of a shear sensor, one or more cameras for tracking predetermined features, capacitive sensors, and/or a vibration sensor.

4. A system according to any preceding clause, comprising a head motion detection unit operable to detect motion of the user's head.

5. A system according to any preceding clause, comprising a head-mountable arrangement motion detection unit operable to detect motion of the head-mountable arrangement.

6. A system according to any preceding clause, wherein the relative motion identification unit is operable to input one or more measurements into a model used to predict or estimate relative motion between the head-mountable arrangement and the user's head, and to use the predicted or estimated relative motion as the identified motion.

7. A system according to any preceding clause, wherein the correction unit is operable to modify the results of a detection of the user's eye position in dependence upon the determined correction.

8. A system according to clause 7, wherein the correction unit is operable to apply a correction to each of the user's eyes individually.

9. A system according to any preceding clause, wherein the correction unit is operable to generate a modified input to an application in dependence upon the determined correction.

10. A system according to any preceding clause, wherein the relative motion identification unit is operable to identify two or more values for the relative motion each corresponding to different respective methods of determining the relative motion.

11. A system according to any preceding clause, wherein the relative motion identification unit is operable to identify an expected relative motion in dependence upon content to be displayed to a user via a display device.

12. A system according to any preceding clause, wherein the head-mountable arrangement is a head-mountable display unit.

13. A method for performing an eye tracking process using a head-mountable eye-tracking arrangement, the method comprising:
  detecting motion of one or both of the user's eyes;
  identifying motion of the head-mountable arrangement relative to the user's head; and
  determining a correction to the eye tracking process in dependence upon the identified motion of the user's head relative to the head-mountable arrangement.

14. Computer software which, when executed by a computer, causes the computer to carry out the method of clause 13.

15. A non-transitory machine-readable storage medium which stores computer software according to clause 14.

The invention claimed is:

1. A system configured to perform an eye tracking process using a head-mountable eye-tracking arrangement, the system comprising:
  an eye tracking unit, located on the head-mountable arrangement, operable to detect motion of one or both of the user's eyes;
  a relative motion identification unit operable to identify motion of the head-mountable arrangement relative to the user's head; and
  a correction unit operable to determine a correction to the eye tracking process in dependence upon the identified motion of the user's head relative to the head-mountable arrangement,
  wherein the relative motion identification unit is operable to input one or more measurements into a model used to predict or estimate relative motion between the head-mountable arrangement and the user's head, and to use the predicted or estimated relative motion as the identified motion.

2. The system of claim 1, the system comprising one or more sensors operable to detect one or both of motion of the user's head and motion of the head-mountable arrangement.

3. The system of claim 2, wherein the sensors include one or more of a shear sensor, one or more cameras for tracking predetermined features, capacitive sensors, and/or a vibration sensor.

4. The system of claim 1, comprising a head motion detection unit operable to detect motion of the user's head.

5. The system of claim 1, comprising a head-mountable arrangement motion detection unit operable to detect motion of the head-mountable arrangement.

6. The system of claim 1, wherein the correction unit is operable to modify the results of a detection of the user's eye position in dependence upon the determined correction.

7. The system of claim 6, wherein the correction unit is operable to apply a correction to each of the user's eyes individually.

8. The system of claim 1, wherein the correction unit is operable to generate a modified input to an application in dependence upon the determined correction.

9. The system of claim 1, wherein the relative motion identification unit is operable to identify two or more values for the relative motion each corresponding to different respective methods of determining the relative motion.

10. The system of claim 1, wherein the relative motion identification unit is operable to identify an expected relative motion in dependence upon content to be displayed to a user via a display device.

11. The system of claim 1, wherein the head-mountable arrangement is a head-mountable display unit.

12. A method for performing an eye tracking process using a head-mountable eye-tracking arrangement, the method comprising:
  detecting motion of one or both of the user's eyes;
  identifying motion of the head-mountable arrangement relative to the user's head; and
  determining a correction to the eye tracking process in dependence upon the identified motion of the user's head relative to the head-mountable arrangement,
  wherein the identifying motion includes inputting one or more measurements into a model used to predict or estimate relative motion between the head-mountable arrangement and the user's head, and using the predicted or estimated relative motion as the identified motion.

13. A non-transitory machine-readable storage medium which stores computer software which, when executed by a computer, causes the computer to perform a method for performing an eye tracking process using a head-mountable eye-tracking arrangement, the method comprising:
  detecting motion of one or both of the user's eyes;
  identifying motion of the head-mountable arrangement relative to the user's head; and
  determining a correction to the eye tracking process in dependence upon the identified motion of the user's head relative to the head-mountable arrangement,
  wherein the identifying motion includes inputting one or more measurements into a model used to predict or estimate relative motion between the head-mountable arrangement and the user's head, and using the predicted or estimated relative motion as the identified motion.

* * * * *